No. 863,288. PATENTED AUG. 13, 1907.
A. LAMPSON & G. F. WARREN.
HARNESS FOR ORCHARD AND VINEYARD USE.
APPLICATION FILED MAR. 7, 1907.

UNITED STATES PATENT OFFICE.

AUGUSTUS LAMPSON, OF GEYSERVILLE, AND GEORGE FORREST WARREN, OF CLOVERDALE, CALIFORNIA.

HARNESS FOR ORCHARD AND VINEYARD USE.

No. 863,288.   Specification of Letters Patent.   Patented Aug. 13, 1907.

Application filed March 7, 1907. Serial No. 361,162.

*To all whom it may concern:*

Be it known that we, AUGUSTUS LAMPSON and GEORGE FORREST WARREN, citizens of the United States, residing, respectively, at Geyserville, in the county of Sonoma, and Cloverdale, in the county of Sonoma, both in the State of California, have invented new and useful Improvements in Harness for Orchard and Vineyard Use, of which the following is a specification.

The present invention relates to an improved harness for use in orchards and vineyards. It is necessary that the ground be cultivated as close as possible to the trees, but in doing so the difficulty is encountered in the liability to scratch or bark the trunks of the trees by the projecting ends of the whiffletree used in drawing the cultivator, plow or other implement. Serious damage to the trees is often caused in this way and it is the object of the present invention to avoid such damage and loss.

Figure 1:
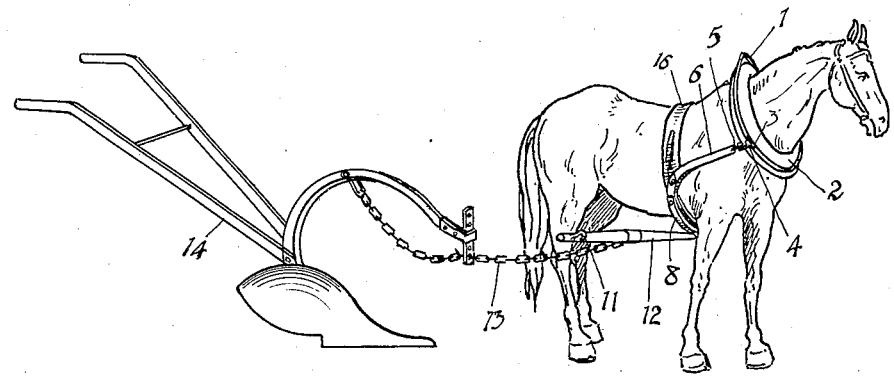
Figure 2:
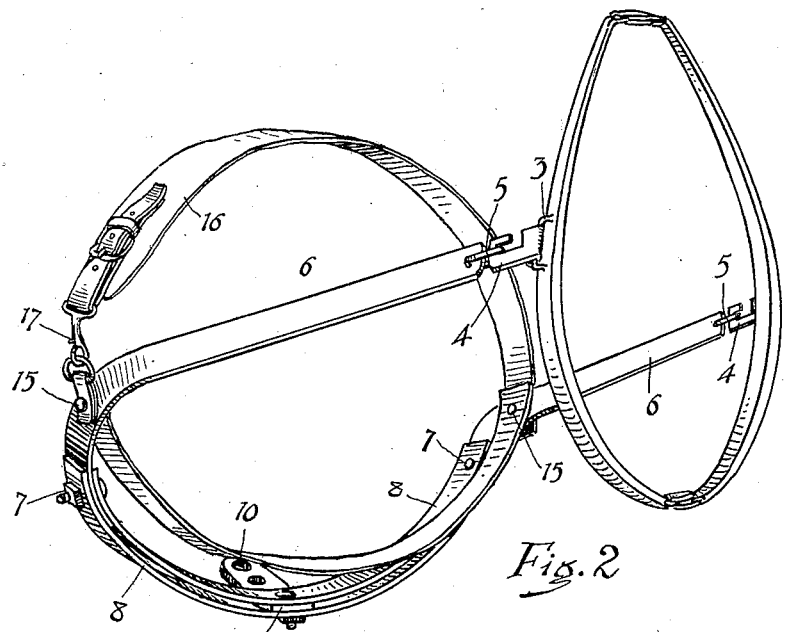
Figure 3:
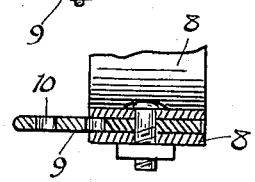

In the accompanying drawing, Figure 1 is a perspective view showing the device in use, one of the pair of horses being removed for clearness of illustration; Fig. 2 is an enlarged perspective view of the device detached; Fig. 3 is a cross section through the clevis.

Referring to the drawing, 1 indicates a metallic collar which is adapted to rest against the padded collar 2 on the horse. Secured to or formed integral with said collar are loops 3 on which are pivotally attached hooks 4. With said hooks engage rings 5 secured on the ends of metallic tugs 6, the rear ends of which are curved downwards and inwards, and are bolted, as shown at 7, to the ends of the inner and outer metallic curved bands 8. Between the centers of said bands is bolted a clevis 9, having an aperture 10, which is engaged by a hook 11 on one end of the whiffletree 12, said whiffletree being connected by a chain 13 to the plow, cultivator or other implement, a plow 14 being here shown. Attached at 15 to the metallic tugs is a flexible girth 16 secured by a snap hook 17.

It will readily be seen that with this harness the liability to bark or injure the trunks of the trees in the orchard by the projecting ends of the whiffletree is avoided. The form and connections of the tugs and bands are such as not to interfere with the free movement of the horse while walking while at the same time the strain transmitted to the collar from the drag of the cultivator is distributed on both sides of the horse.

I claim:—

1. In a harness of the character described, the combination, with a collar, of metallic tugs attached thereto, bent downwards at their rear ends, a curved metallic band secured to the ends of the tugs and adapted to pass under the horse, a flexible girth adapted to encircle the horse and attached to the tugs, and a fastening device secured centrally to the band, and adapted to be attached to the end of a whiffletree, substantially as described.

2. In a harness of the character described, the combination with a collar, of metallic tugs attached thereto, bent downwards and inwards at their rear ends, curved metallic bands secured to the ends of the tugs and adapted to pass under the horse, a flexible girth adapted to encircle the horse and attached to the tugs, and a fastening device secured centrally to the bands and adapted to be attached to the end of a whiffletree, substantially as described.

In testimony whereof we have hereunto set our hands in the presence of two subscribing witnesses.

AUGUSTUS LAMPSON.
GEORGE FORREST WARREN.

Witnesses:
I. S. LEWIS,
A. BENTLEY.